Oct. 10, 1961  W. N. POUNDSTONE  3,003,612
ARTICULATED SELF-TRACKING CONVEYING APPARATUS
Filed Jan. 17, 1956  8 Sheets-Sheet 1
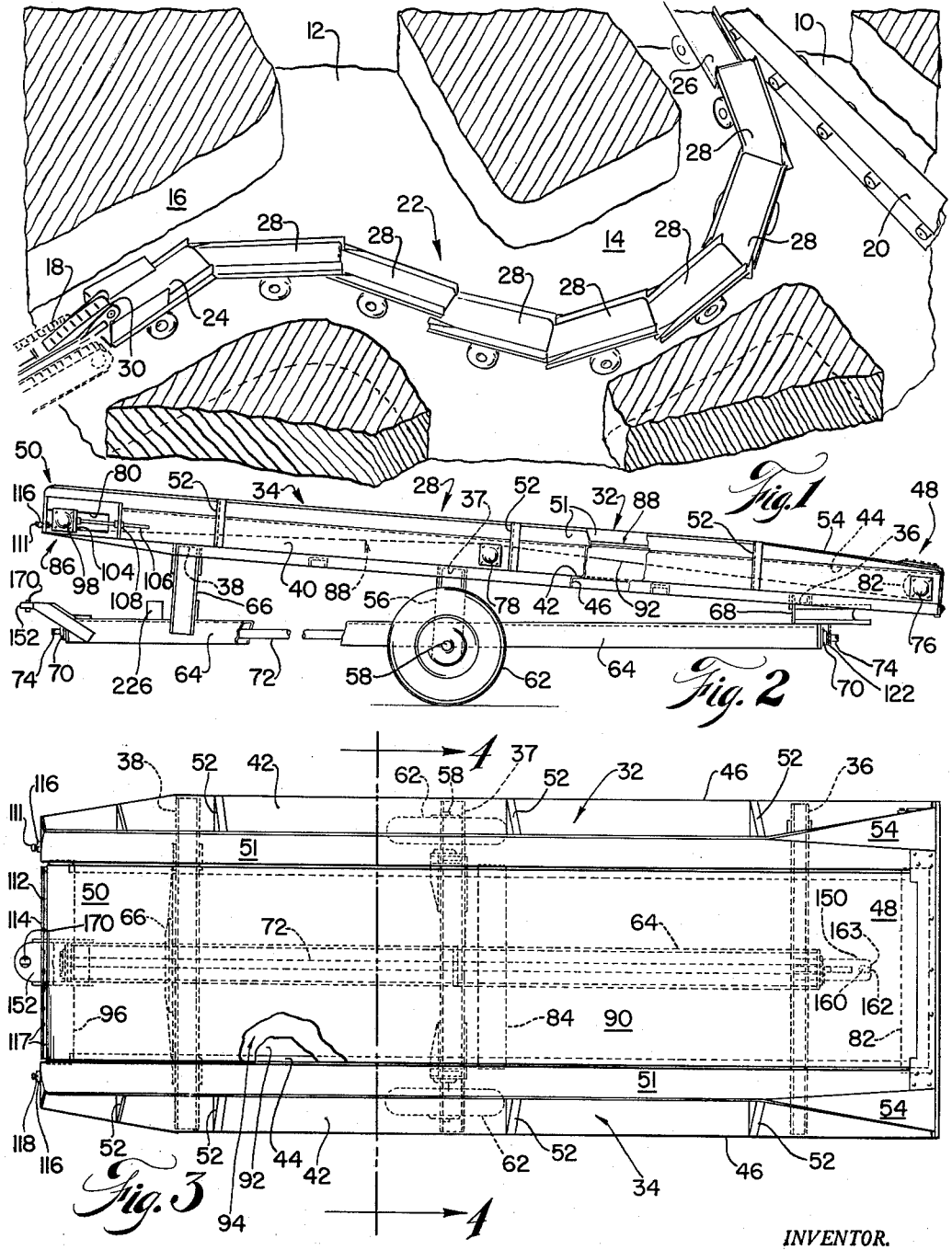
INVENTOR.
WILLIAM N. POUNDSTONE
BY Stanley J Price
his Attorney

INVENTOR.
WILLIAM N. POUNDSTONE

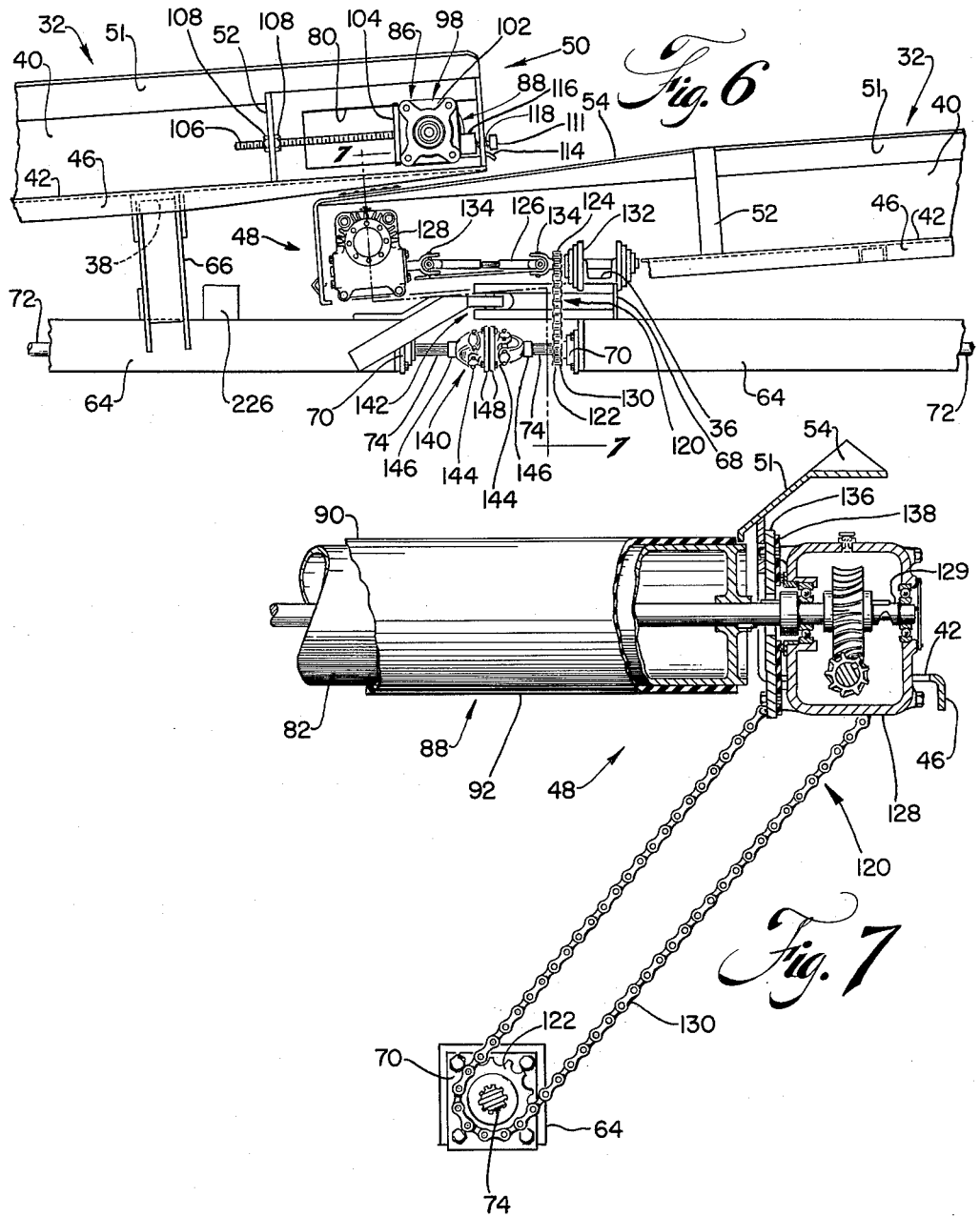

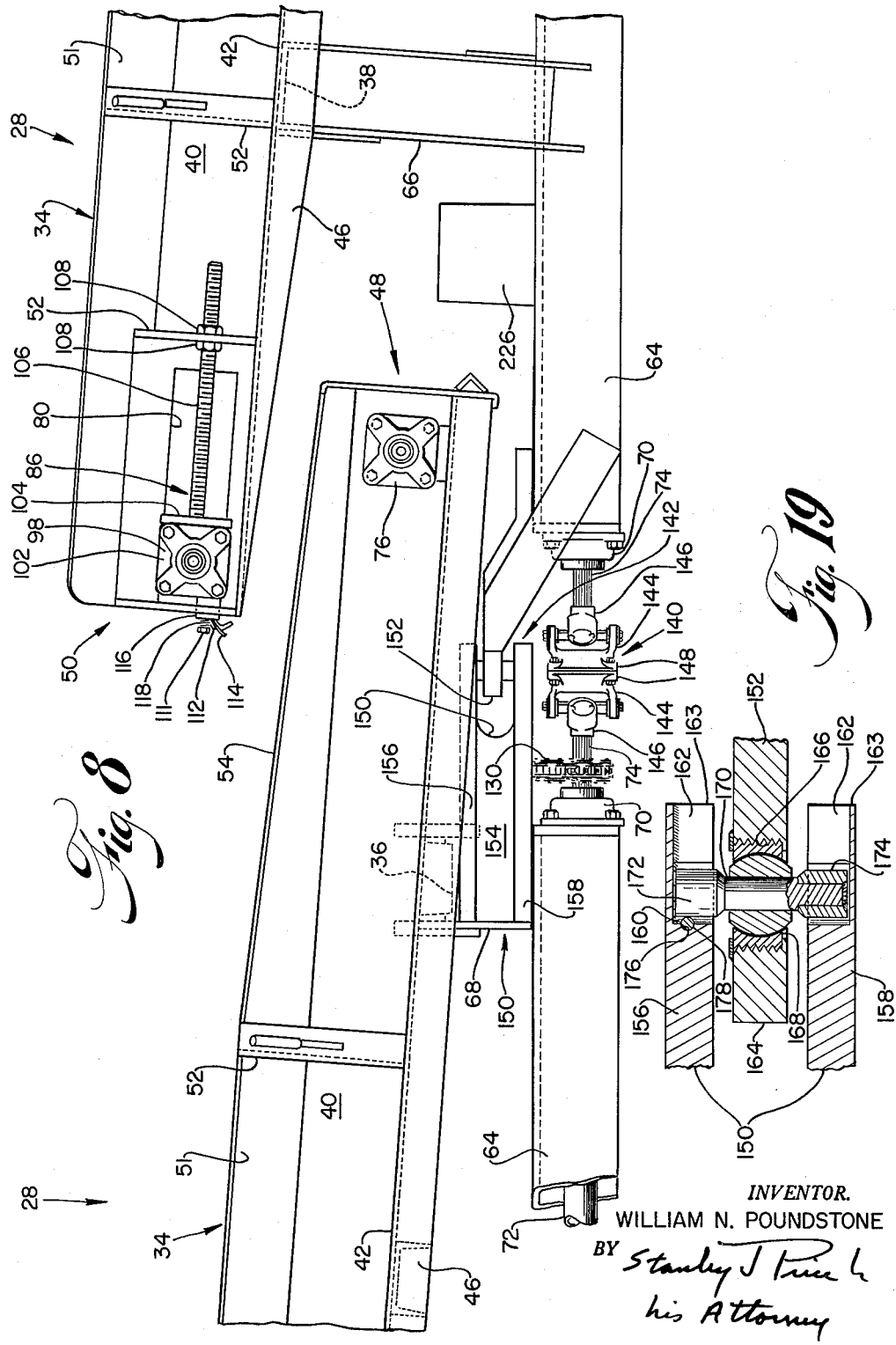

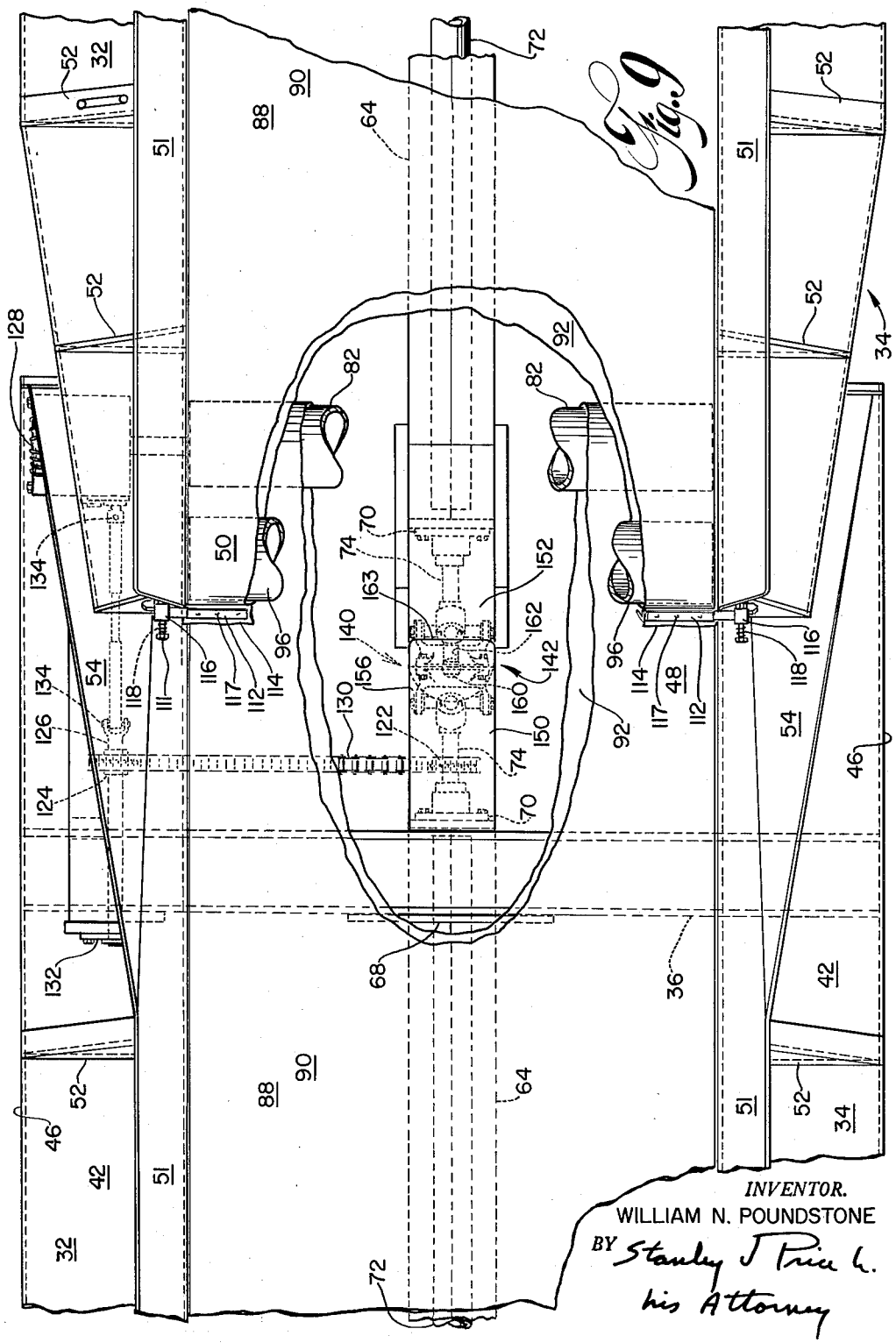

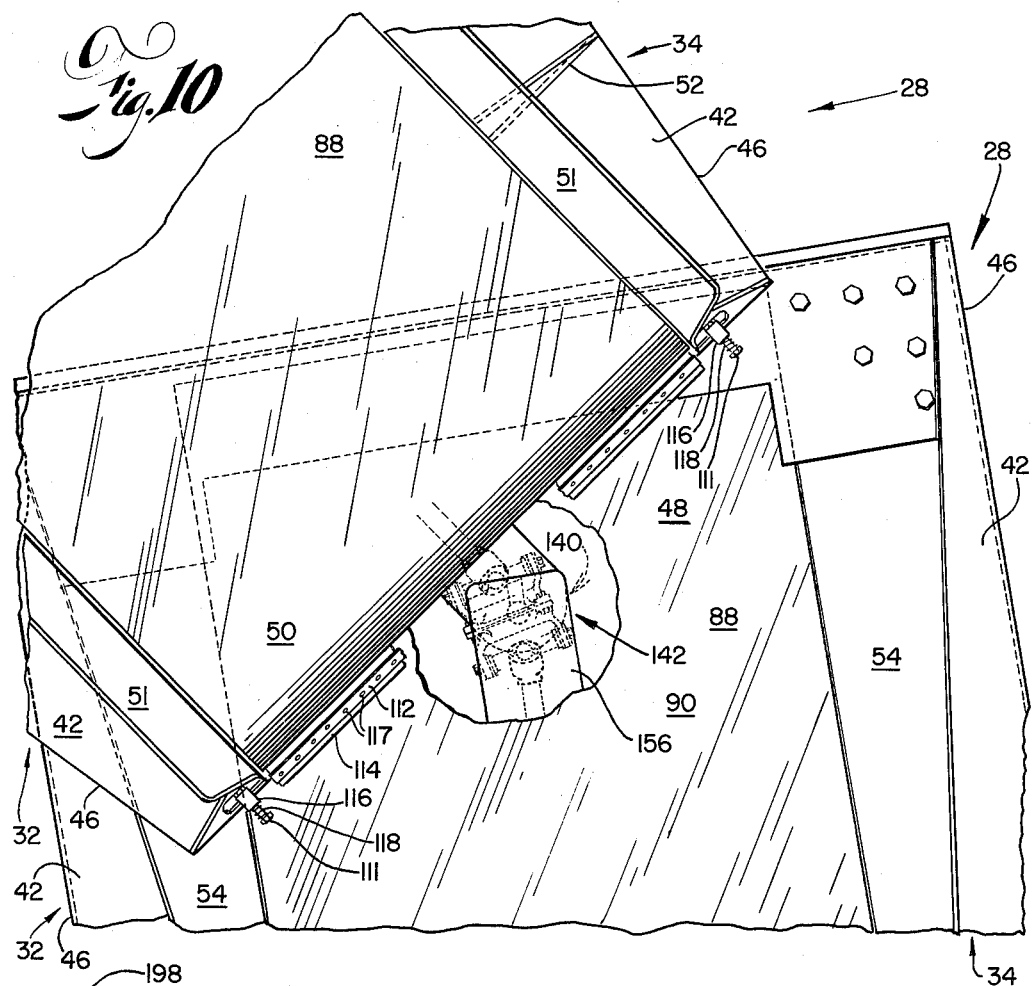
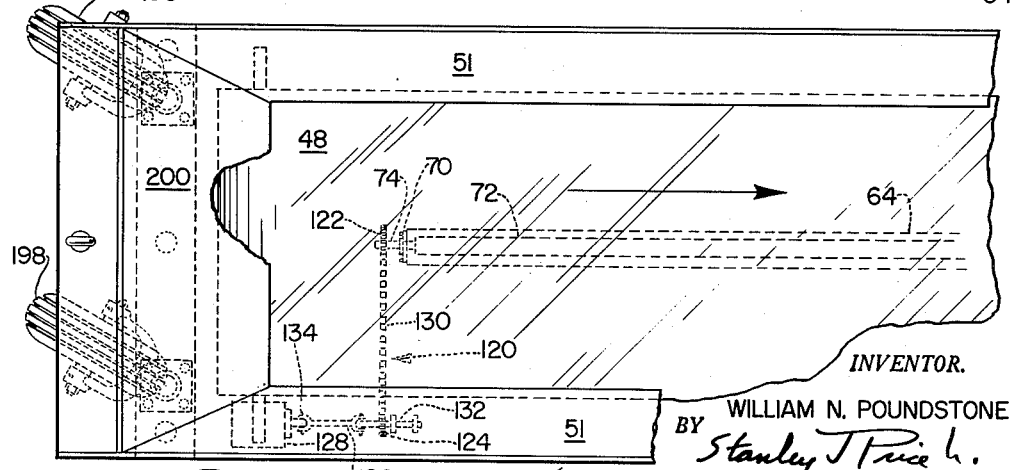

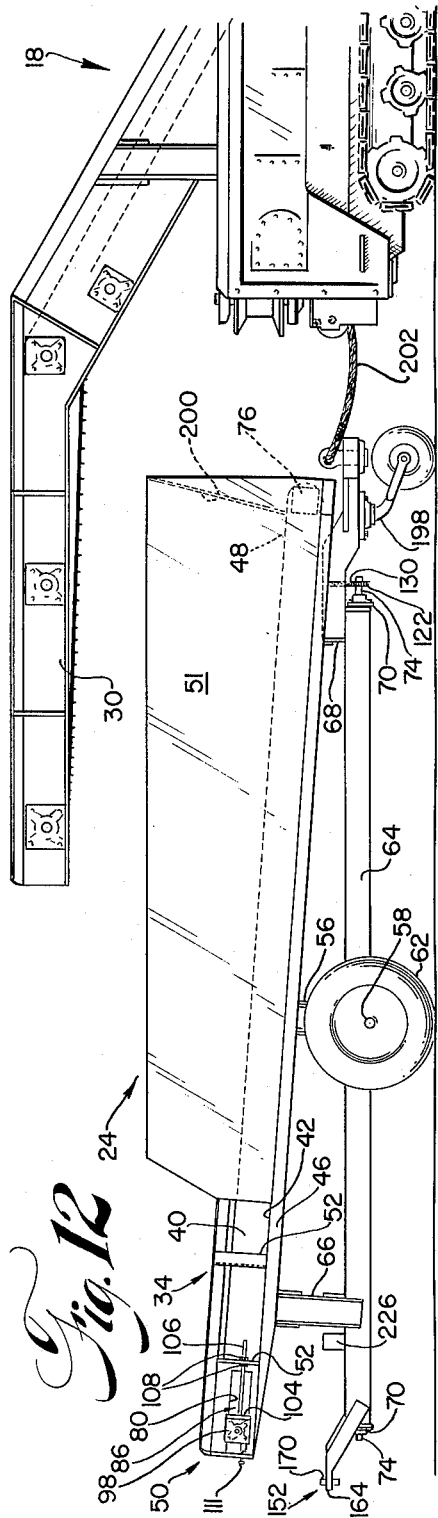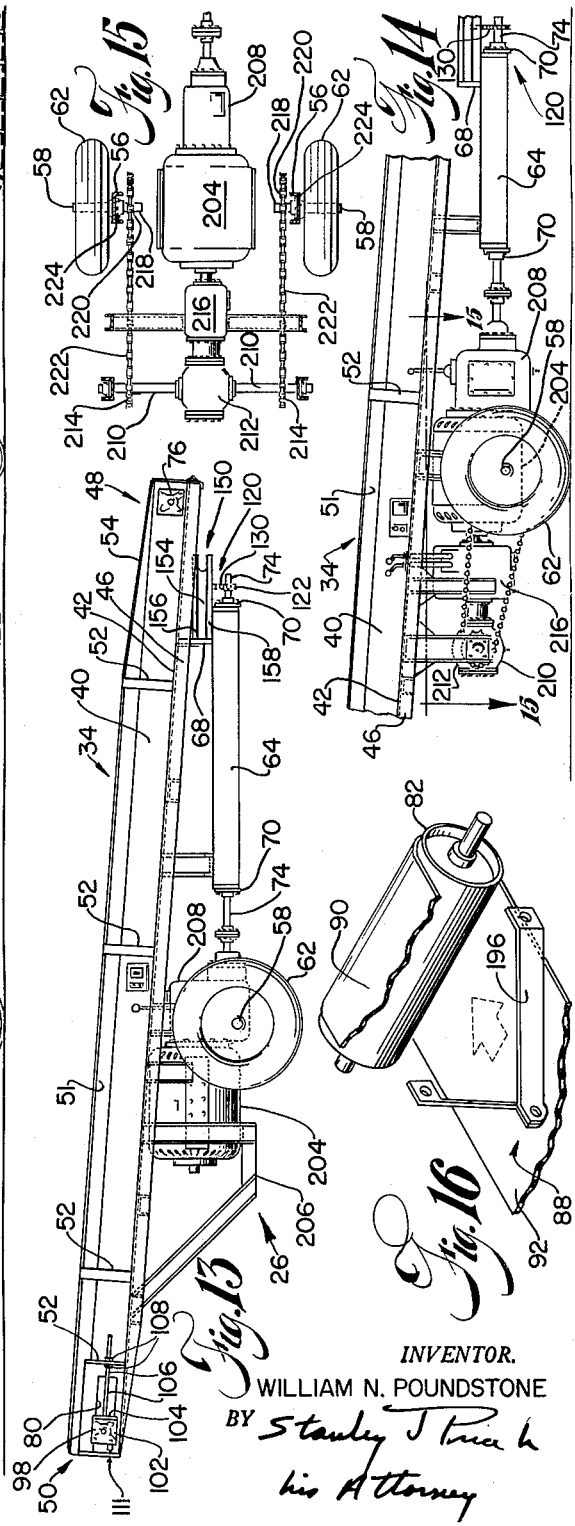
INVENTOR.
WILLIAM N. POUNDSTONE

INVENTOR.
WILLIAM N. POUNDSTONE

United States Patent Office 3,003,612
Patented Oct. 10, 1961

3,003,612
ARTICULATED SELF-TRACKING CONVEYING APPARATUS
William N. Poundstone, Morgantown, W. Va., assignor to Consolidation Coal Company, Pittsburgh, Pa., a corporation of Pennsylvania
Filed Jan. 17, 1956, Ser. No. 559,596
19 Claims. (Cl. 198—92)

This invention relates to improvements in conveying material along a sinuous path and more particularly to apparatus for conveying dislodged material from a mine face to straight line relatively fixed conveying means.

In a conventional mining operation there usually is a main longitudinal haulageway and a plurality of intersecting lateral passageways. Either a track haulage system or a permanent fixed conveyor is employed to convey the material from the lateral haulageways through the main haulageway to the mine shaft where the mineral is conveyed to the surface. The main haulageway transportation system is designed to have a haulage capacity equal to or greater than the capacity of the continuous mining machines working the lateral connecting passageways. One of the problems encountered in the mining of materials with continuous mining apparatus is the conveying of the mined material from the working face through the lateral connecting passageways to the main haulageway transportation system. This is particularly true when the continuous mining machine is working a block system which is lateral to the connecting passageways. The path the mined material must follow from the working face to the main line haulageway is sinuous and continuously changing because of the maneuvering and advancing of the continuous miner.

Several solutions for this conveying problem have been suggested. One solution is the use of self-propelled shuttle car type haulage vehicles which shuttle back and forth from the working face to the fixed transportation means with a cargo of mined material. In using the shuttle car it is necessary for the continuous mining machine to stop the mining operation as the shuttle cars are moving into position under the continuous mining machine's discharge boom. This intermittent operation of the continuous mining machine offsets the advantages which could be obtained by using continuous mining apparatus. Other proposed methods have similarly presented problems which lower the efficiency of continuous mining techniques.

The apparatus of my invention solves the problem of connecting the continuous mining machines to a straight line conveying means which may be either a main line conveyor or a relatively fixed conveyor in one of the lateral passageways. My conveying means is operable to continuously remove the material dislodged by the continuous mining machine and convey the same to the straight line conveying means. The fact that the mining machine may follow a curved or sinuous path in the mining operation has little or no effect on my conveying means due to its articulated and self-tracking features.

Another feature of my articulated conveying apparatus is the fact that it is operable in relatively narrow passageways as well as in wide passageways. In wide passageways my conveying apparatus may discharge the mined material directly onto a fixed conveyor means or onto track type haulage means and, as the continuous mining machine advances, the discharge end portion of my conveyor means will remain adjacent to and in discharge relation with the fixed or permanent haulage means. In narrow passageways my conveying apparatus may be used with an extensible conveyor, i.e. a conveyor similar to the conveyor shown and described in my copending application Ser. No. 525,053 now Patent No. 2,879,049. The extensible conveyor may be extended linearly as the distance between the fixed conveyor and the working face increases and my present articulated conveyor means may be moved laterally to follow the continuous mining machine along its sinuous path. A shuttle car may be positioned between the material discharge section of my articulated conveyor means and the material receiving end portion of the extensible conveyor to provide the tractive force required to extend the extensible conveyor and to withdraw my articulated conveyor as the continuous mining machine withdraws from the working face. In this manner my conveying means is operable to continuously remove and convey all of the material dislodged by the continuous mining machine. This permits the continuous mining machine to continuously operate and dislodge a maximum amount of material in any given period of time.

My articulated conveying means comprises a material receiving section which is adapted to be secured to a continuous mining machine, a material discharge section which is adjacent to the fixed conveying means and a plurality of intermediate sections between the material receiving section and the material discharge section. The material receiving, material discharge and intermediate sections are interconnected to each other and each has an independent endless belt conveyor extending longitudinally thereon. The sections are so connected that the material discharge end of one section overlaps the material receiving end of the adjacent section and material which leaves one section at the discharge end is received on the material receiving end of the adjacent section irrespective of the angle between the adjacent sections. Each section is supported by a pair of wheels positioned intermediate the section coupling means and each section has a drive shaft extending longitudinally thereon below the conveyor belt. An offtake means connects the drive shaft on each section with the belt conveyor through a speed reducer. Thus as the shaft is rotated the load carrying portion of the endless belt member moves in a direction from the material receiving end toward the material discharge end. The sections are interconnected to each other by means of a pin type coupling which has pivotal movement in both the horizontal and vertical planes, permitting the sections to advance over uneven surfaces without impairing the connection or operation of the sections. The rotatable shaft on each section is interconnected to the rotatable shafts of adjacent sections by means of a double universal type connection which transmits the rotative movement of one shaft to the other. The vertical axes of the pin type coupling and the double universal type connection are positioned one above the other so that a common pivot axis is realized. A single drive means for all the independent endless conveyor belts on the interconnected sections may be positioned on the material discharge section and be adapted to rotate all the rotatable shafts of all the interconnected sections. Thus the independent conveyor belts on each section may be driven by a single drive means positioned on the material discharge section. The material discharge section may be provided with steerable means to maintain the position of the material discharge section in discharge relation with the fixed conveyor. The self-tracking feature of my articulated conveyor is due to the flexible couplings between the sections and supporting wheels positioned substantially intermediate the pivot axes of the front and rear flexible couplings. The intermediate positioning of the support wheels provides first a single pivot point on that wheel situated on the inside of the turning circle and second a symmetrical conveyor section. Because of the symmetry the steering motion of the forward or front coupling of the section is exactly duplicated by the rear coupling of the same section. In this manner whatever motion or turn the front end of the section describes the same will be duplicated by the front end of the second conveyor section and, in turn duplicated by each subsequent section. It should be noted that the support wheels are located substantially intermediate the flexible coupling. If the wheels are located elsewhere the rate of turning one end of the section will be different relative to the rate of turning of the other end. The arc thus described by the path of the section will have, in the latter instance, a continuously changing radius of curvature which results in loss of the self-training features and eventually contact of the trailing conveyor sections with the wall of the haulageway. By self-tracking it is meant that the sections avoid alignment with each other as they are pulled through a curved path by a propelling means. The sections, instead of aligning with each other, that is, deviating from a curved path to a substantially linear path, continue around the curved path following each preceding section and retaining the same curve radius.

The principal object of this invention is to provide an articulated conveying means operatively associated with a continuous mining machine and adapted to continuously convey the material discharged by the continuous mining machine to a relatively fixed conveying means.

Another object of this invention is to provide a mechanical actuating means for a plurality of independent conveyor sections.

Another object of this invention is to provide a self-tracking articulated conveying means.

Another object of this invention is to provide a plurality of interconnected articulated conveyor sections having a single drive mechanism.

Another object of this invention is to provide a plurality of interconnected conveyor sections operable to discharge material from one section to the adjacent section irrespective of the alignment of said sections.

Another object of this invention is to provide a new conveyor belt take-up and wiper means.

Another object of this invention is to provide a new type of coupling member adapted to couple adjacent conveyor sections.

Another object of this invention is to provide a removable and adjustable belt supporting plate.

Other objects will become apparent throughout the specification and claims as hereinafter related.

This invention consists of the new and improved construction and combination of parts and their cooperative relationship to be more fully described hereinafter, the novelty of which will be particularly pointed out and distinctly claimed.

In the accompanying drawings, to be taken as part of this specification, I have fully and clearly illustrated my invention, in which drawings:

FIG. 1 is a perspective view of my articulated conveyor operatively associated with a continuous mining machine and arranged to discharge onto a fixed conveyor means.

FIG. 2 is a view in side elevation of an intermediate section with a portion of the frame side wall broken away to illustrate the endless conveyor belt and supporting deck plate. FIG. 2 also has a section of the drive tube support broken away to illustrate the drive tube positioned therein.

FIG. 3 is a top plan view of an intermediate section with portions of the conveyor belt broken away to illustrate the inwardly turned flange member on the frame side wall.

FIG. 6 is a fragmentary view in elevation of two interconnected sections illustrating the relative positions of the material discharge end portion of one section and the material receiving end portion of the adjacent section. This figure also illustrates the relative positions of the universal joint connecting the rotatable drive shaft and the pivot type coupling member for the adjacent sections.

FIG. 7 is a view taken along the line 7—7 in FIG. 6 illustrating the general arrangement of the drive take-off means from the rotatable drive shaft and the reducer means interconnected with the drive roller.

FIG. 8 is an enlarged fragmentary view of a pair of interconnected intermediate sections and illustrates the relative positions of the section coupling members and the rotatable shaft coupling members.

FIG. 9 is a plan view of a pair of interconnected intermediate sections with portions of the conveyor belt broken away to illustrate the relative positions of the shaft coupling means and section coupling means to each other.

FIG. 10 is a view similar to FIG. 9 with the interconnected sections at an angle to each other and again illustrating the relative positions of the shaft coupling means and section coupling means in respect to material discharged from the discharge end portion of interconnected sections.

FIG. 11 is a plan view of the receiving end portion of a material receiving section.

FIG. 12 is a view in elevation of a material receiving section operatively associated with a continuous mining machine with the discharge boom from the mining machine extending over the material receiving section hopper.

FIG. 13 is a view in elevation of a material discharge section with the drive means for the rotatable shafts positioned thereon.

FIG. 14 is another embodiment of a material discharge section wherein the drive means for the rotatable shaft is interconnected with a means to propel the material discharge section.

FIG. 15 is a plan view taken along the line 15—15 in FIG. 14 and showing the chain type drive operable to propel the material discharge section.

FIG. 16 is a fragmentary perspective view illustrating the belt wiper means for the under side of the conveyor belt.

FIG. 19 is a fragmentary detail view of the pin coupling means for each section.

Figure 4:
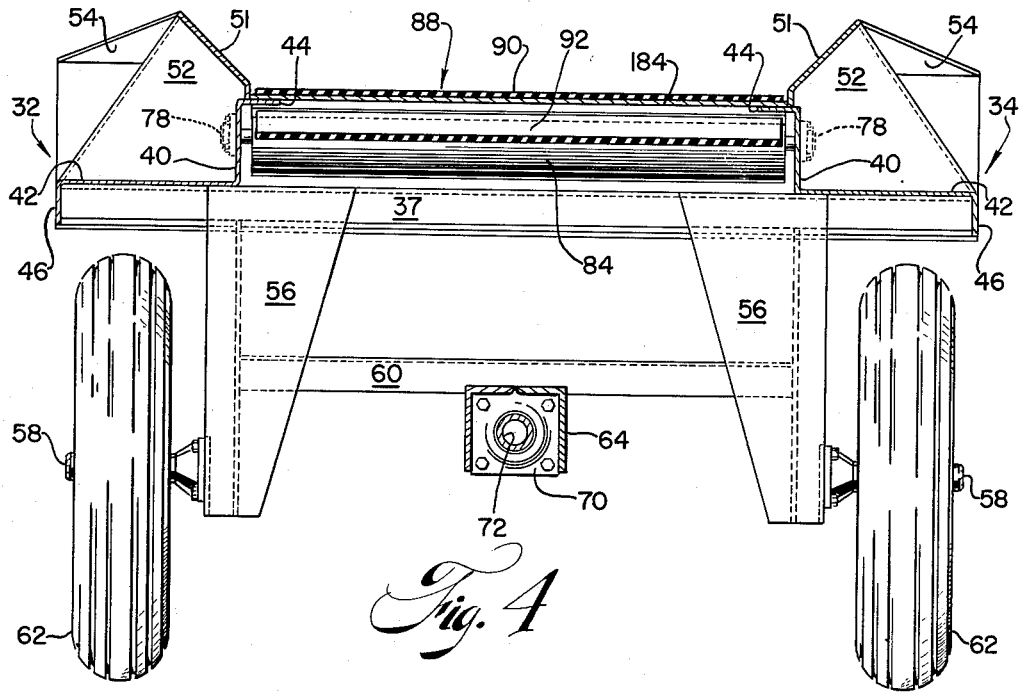
FIG. 4 is a view in elevation taken along the line 4—4 in FIG. 3 illustrating the intermediate idler roller and the inwardly turned flange on the frame side walls.

Referring to FIG. 1 of the drawings there is shown in perspective a portion of a mine with a main haulageway 10, a parallel passageway 12 and a lateral passageway 14 therebetween. Extending laterally from the passageway 12 is a room 16 being worked by a continuous mining machine 18. The material dislodged by the continuous mining machine 18 is conveyed to the fixed conveyor belt 20 by means of my articulated conveying means generally indicated by the numeral 22. The material conveyed from the continuous mining machine 18 may be discharged onto the fixed conveyor belt 20 by means of a suitable chute arrangement connected to my articulated conveying means 22 which is not shown. The material deposited on the main line conveyor belt 20 is then conveyed to the surface.

In developing or working a room similar to the room 16 the continuous mining machine 18 moves forward into the seam a given distance, dislodging material as it advances. Then the continuous mining machine 18 retracts, maneuvers to an adjacent unmined portion of the seam and again advances in a path parallel to the previous path dislodging material. In doing so, the path between the continuous miner 18 and the fixed conveyor belt 20 will vary both in length and direction. During this mining operation, to maintain a continuous mining system, it is necessary to have some means of continuously conveying the material from the continuous mining machine 18 to the fixed conveyor belt 20. My articulated conveying means 22 serves this purpose and continues to change position to follow the continuous mining machine 18 without interrupting the mining and conveying operation.

The articulated conveying means 22 comprises a material receiving section 24, a material discharging section 26 and a plurality of intermediate sections 28. The intermediate sections 28 are coupled to each other in linear fashion and coupled at one end to the rear portion of the material receiving section 24 and at the other end to the front end of the material discharging section 26. In turn the material receiving section 24 is connected to the continuous mining machine 18 and follows the mining machine 18 as it advances into the seam. The continuous mining machine 18 has a discharge boom 30 extending rearwardly therefrom which is operatively associated with the material receiving section 24 so that any material discharged from the continuous mining machine boom 30 will be received by the material receiving section 24.

An intermediate section 28, shown in detail in FIGS. 2, 3 and 4 has a frame portion with a pair of longitudinal side members 32 and 34 and lateral securing members 36, 37 and 38. The lateral members 36, 37 and 38 maintain the side members 32 and 34 in spaced parallel relation to each other. The side members 32 and 34 are substantially similar in construction and have a vertical side wall 40 with a lower outwardly extending flange portion 42 and an upper inwardly extending flange portion 44. The outwardly extending flange portion 42 has a downwardly extending end portion 46. The lateral securing members 36, 37 and 38 extend beyond the vertical side walls 40 and abut the inner surface of the downwardly extending end portions 46 to add rigidity thereto (FIG. 4).

Each of the intermediate sections 28 has a material receiving end portion 48 and a material discharging end portion 50. Secured to the upper inwardly extending flange 44 of each of the longitudinal side members 32 and 34 is a longitudinal trough side wall 51. The lower edge of the trough side wall 51 is secured to the upper inwardly extending flange 44 by means of a weld or the like. A plurality of gusset plates 52 support the longitudinal trough side walls 51 in material guiding position. The longitudinal trough side walls 51 have an outwardly bent portion 54 adjacent the material receiving end portion adapted to receive and divert conveyed material toward the central longitudinal axis of the intermediate section 28.

A pair of spaced wheel supporting members 56 extend downwardly from the lateral securing member 37 and each has an axle 58 secured to and extending outwardly from the lower portion thereof. A cross member 60 maintains the wheel supporting members 56 in spaced parallel relation to each other. A wheel 62 is rotatably secured to each of the axles 58 and rotatably supports the intermediate sections 28. The side member lower outwardly extending flange 42 extends beyond the outer periphery of the wheel 62 to protect the wheel 62 from being damaged by the walls of mine passageways.

A shaft housing 64 extends longitudinally below the longitudinal side members 32 and 34 and is secured thereto by means of connecting members 66 and 68. The shaft housing 64 is also secured to the lower edge of the transverse wheel supporting cross member 60. A pair of bearings 70 are secured in the end portions of the shaft housing 64 and rotatably support therein a tubular shaft 72. The tubular shaft 72 extends beyond the bearing members 70 and has splined end portions 74. The tubular shaft 72 and shaft housing 64 are so arranged and secured to the side members 32 and 34 that the material discharging end portion 50 will be above the material receiving end portion 48 of the same section when the tubular shaft 72 and shaft housing 64 are in a horizontal plane (FIG. 2).

The intermediate section side members 32 and 34 have a pair of aligned bearing members 76 adjacent the material receiving end portion 48, a pair of intermediate pillow block members 78 and a pair of slotted portions 80 adjacent the material discharge end 50 (FIG. 2). A drive roller 82 extends laterally between the side members 32 and 34 and is rotatably positioned in the bearing members 76. An idler roller 84 extends laterally between the side members 32 and 34 and is rotatably positioned in the intermediate pillow block bearings 78. A take-up roller assembly 86 extends laterally between the side members 32 and 34 adjacent the material discharging end portion 50. An endless conveyor belt 88 extends around the drive roller 82 and the take-up roller assembly 86 and has a load carrying flight 90 and a return flight 92. The return flight 92 passes over the top of the idler roller 84 to prevent the return flight 92 from rubbing on the cross member structure. A deck plate assembly 94 is positioned under the load carrying flight 90 and supports the same throughout the entire length of the intermediate section 28.

Figure 5:
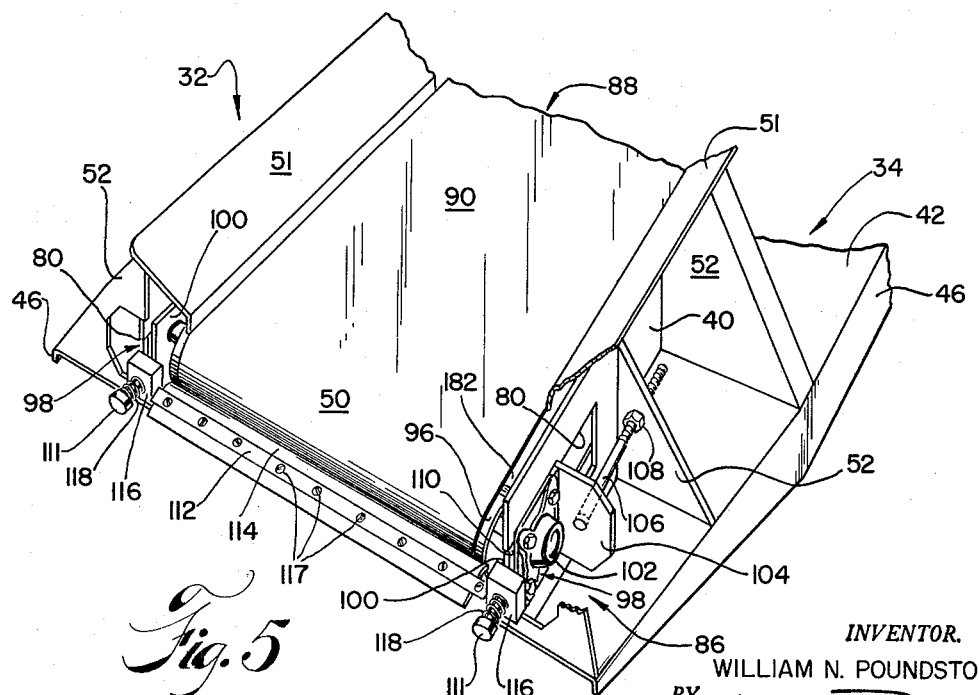
FIG. 5 is a perspective view of the material discharge end portion of an intermediate section illustrating the combined conveyor belt take-up and belt wiper mechanism.

The take-up roller assembly 86, shown in detail in FIG. 5, has a lateral take-up roller 96 extending between section side members 32 and 34 and is supported in movable bearing members 98 which are slideably positioned in the side member slotted portions 80. The movable bearing members 98 have an inner plate 100 secured to pillow block bearings 102 in such manner that the plate 100 and bearing 102 straddle the upper and lower edges of the slotted portions 80 with sufficient clearance therebetween to permit longitudinal movement of the bearing members 98 in the slotted portions 80. This longitudinal movement of the entire take-up roller assembly 86 provides a means to vary the distance between the drive roller 82 and the take-up roller 96. The pillow block bearings 102 have an outwardly flanged portion 104 with adjusting bolt members 106 extending therefrom in a direction parallel to the section side members 32 and 34. The gusset plate 52 adjacent the material discharging end portion 50 has an aperture therethrough which receives the longitudinal bolt member 106. Retaining nuts 108 are threadedly secured on the bolts 106 and abut the gusset member 52. The nuts 108 are operable to restrain longitudinal movement of the take-up roller assembly 86. The rotation of the nuts 108 in a counter clockwise direction moves the take-up assembly 86 in a direction away from the drive roller 82. Between the inner plate 100 and the inner surface of the pillow block bearings 102 there is a spacing block member 110 having a longitudinal threaded aperture therethrough. Bolts 111 are threadedly secured in the spacing block member 110 and extend longitudinally therefrom. A belt wiping bar 112 extends parallel to the roller 96 and is in spaced relation thereto. A flexible belt wiping member 114 is secured to the wiping bar 112 with screws 117 and is operable to abut the conveyor belt 88 as it passes around the take-up roller 96. Block members 116 are rigidly secured to the ends of the belt wiping bar 112 and have longitudinal apertures therethrough. The bolts 111 extend through the apertures in the blocks 116 so that the blocks 116 are longitudinally movable thereon. Spring members 118 are positioned between the heads of bolts 111 and the blocks 116 and urge the belt wiper members against the conveyor belt 88. Thus, through the springs 118, the belt wiper member 114 will continuously abut the conveyor belt 88 irrespective of wear thereto and continue to perform its belt wiping function. Also, with this type of take-up assembly, the belt wiper member 114 remains in wiping contact with the conveyor belt 88 irrespective of the position of the take-up roller 96 in the side wall slotted portions 80. This is due to the wiper components being secured to the slideable bearing members 98 and being movable therewith in the slotted portions 80.

In FIGS. 6, 7 and 9 there is shown a drive off-take means 120 which interconnects the drive roller 82 with the tubular rotatable shaft 72. The drive off-take means consists essentially of a sprocket member 122 secured to the rotatable shaft 72, a second sprocket member 124 secured to an auxiliary shaft 126 (FIG. 6) and a speed reducer 128 interconnecting the auxiliary shaft 126 with the axle of the drive roller 82. A flexible roller chain 130 transmits the rotative movement of the tubular shaft 72 to the auxiliary shaft 126 which in turn transmits the rotative movement to the speed reducer 128 and drive roller 82. The auxiliary shaft 126 is supported at one end by means of a bearing member 132 and at the other end by means of a bearing within the speed reducer 128. The auxiliary shaft 126 has pin members 134 which facilitate assembly of the off-take means and also may function as a shear pin mechanism. The speed reducer 128 may be a conventional type reducer having worm type gears and a hollow driven shaft 129 through which the axle of the drive roller 82 extends. The speed reducer 128 is secured to a speed reducer plate 136 which in turn is secured to vertical side wall 40 of the longitudinal side member 32. A rubber pad 138 is positioned between the speed reducer and the speed reducer plate 136 to facilitate alignment of the axle drive roller 82 in the bearing 76 and the speed reducer shaft 129.

As shown in FIGS. 6, 8 and 9 the intermediate sections have a shaft coupling assembly 140 and a section coupling assembly 142. The shaft coupling assembly 140 consists essentially of a pair of universal connections 144 having a shaft-receiving passageway 146 and a connecting plate 148. The shaft splined end portions 74 are secured in the shaft-receiving passageway 146 and the connecting plates 148 are secured to each other, thus the shaft coupling assembly 140 consists of a double universal joint type coupling wherein the rotation transmitted therethrough is the same irrespective of non-alignment of the shafts 72.

The section coupling assembly 142 is also shown in FIG. 19 and has a receiver member 150 which extends longitudinally beneath the receiving end portion 48 of each section and an arm member 152 which extends longitudinally beneath the material discharging end portion 50 of each section. The receiver member 150 is secured to both the upper portion of the rotatable shaft housing 64 and to the lateral supporting member 36 and has a web portion 154 and upper and lower flange portions 156 and 158. Each of the flange portions 156 and 158 has aligned parallel pin receiving portions 160 with passageways 162 connecting the pin receiving portion 160 with the flange end portions 163 (FIGS. 3, 9 and 19). The lateral dimension of the passageway 162 is smaller than the diametrical dimension of the pin receiving portions 160. The arm member 152 is secured to the upper portion of the rotatable shaft housing 64 and has a free end portion 164 which extends beyond the material discharging end portion 50 of the section 28. The arm member end portion 164 has a threaded bearing receiving passageway 166 extending vertically therethrough. A spherical bearing member 168 is threadedly secured in the passageway 166 and receives a vertical pin member 170. The pin member 170 is movable about its vertical axis in the bearing member 168 and is also rotatable about its longitudinal axis. The pin member has upper and lower end portions 172 and 174 which are non-circular in shape and have a transverse major axis and a transverse minor axis. The dimension of the transverse minor axis is slightly smaller than the lateral dimension of the passageways 162 in the receiver member flange portions 156 and 158. The transverse major axis of the pin end portions 172 and 174 is slightly smaller than the diametrical dimension of the pin receiving portion 160 in the receiver member 150.

To couple the arm member 152 to the receiver member 150, it is necessary for the transverse major axis of the pin end portions 172 and 174 to be aligned with the longitudinal axis of the arm member 152. This permits the pin member 170 to be guided through the passageways 162 into the pin receiving portions 160. To lock the pin member 170 in the circular receiving portions 160 the pin member 170 is rotated 90° until the transverse major axis of the pin end portions 172 and 174 extend laterally to the passageways 162. Since the transverse major axis of the pin end portions is greater than the lateral dimension of the passageway 162 the pin 170 when in the last named position cannot be withdrawn from the pin receiving portions 160. The receiver member top flange 156 has a horizontal passageway 176 therethrough intersecting the pin receiving portion 160. A rod member 178 extends through the passageway 176 and prevents rotation of the pin member 170 when positioned in the pin receiving portions 160.

Figure 18:
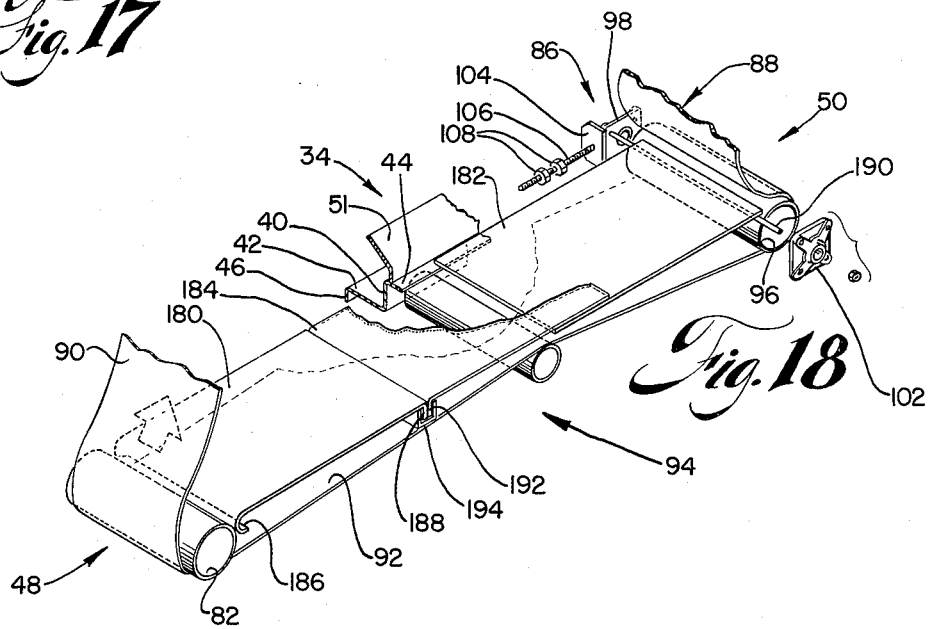
FIG. 18 is a perspective view of the supporting deck plate mechanism.

In FIG. 18 there is shown the deck plate assembly 94 which supports the conveyor belt load carrying flight 90 and comprises an end plate 180 adjacent the material receiving end portion 48, a second end plate 182 adjacent the material discharge end portion 50 and an intermediate plate 184 positioned therebetween. The end plate 180 has a curved end portion 186 adjacent the drive roller 82 and a downwardly extending flange other end portion 188. The end plate 182 has a lateral rod member 190 secured to its underside. The rod 190 extends beyond the end plate 182 and is secured in the take-up roller assembly 86 so that the plate 182 is movable with the take-up roller assembly 86. The intermediate plate 184 has a downwardly extending end flange 192. The various portions of the deck plate assembly 94 rest on the section side wall inwardly extending flanges 44 and are slideable thereon. A channel member 194 extends laterally between the section side walls 40 and is rigidly secured thereto. The downwardly extending flanges 188 and 192 are positioned in the channel member 194 and prevent longitudinal movement of plate members 180 and 184. The plate 184 overlaps the plate 182 so that the deck plate assembly 94 has an adjustable longitudinal dimension. This dimension is determined by the distance between the take-up roller assembly 86 and the drive roller 82. It is now possible to use a seamless endless conveyor belt with the adjustable deck plate assembly 94. To assemble the seamless endless conveyor belt 88 on the drive and take-up roller 82 and 96 the rollers are removed from the section 28 and inserted between the seamless endless conveyor belt. The drive roller 82 is then secured in position in the speed reducer 128 and in the bearing 76. The take-up roller assembly is then secured in operative position with the take-up roller assembly 86 being moved as close as possible to the drive roller 82 and yet retained within the slotted portions 80. The plate 180 is then positioned between the load carrying flight 90 and return flight 92 with the flange portion 188 in the channel portion 194. The other end plate 182 is then secured in position in the take-up assembly 86. The intermediate plate 184 is then positioned as shown in FIG. 18. To tighten the belt on the rollers 82 and 96 the take-up assembly 86 is adjusted as heretofore described.

In FIG. 16 there is shown the drive roller 82 with the belt return flight 92 thereunder and extending therearound. A wishbone type wiper 196 rests on the upper surface of the return flight 92 and removes any debris which may collect thereon. The wishbone wiper 196 is secured to the section side walls 40 and maintains contact with the upper surface of the return flight 92 by means of its own weight.

The material receiving sections 24 and material discharge sections 26 have many components which are similar to the intermediate sections 28 and similar numerals designate similar components on all sections. In FIGS. 11 and 12 the material receiving section is shown in detail. As shown the rotatable drive shaft 72 terminates adjacent the material receiving end portion 48, however it is within the scope of this invention to have the drive means also connected to the rotatable shaft 72 on the material receiving section 24. The source of power for the rotation of the shaft 72 could be a power off-take means from the continuous miner 18 or some intermediate source of rotative power. A pair of caster type wheels 198 are positioned under the material receiving end portion 48 to support the same. The longitudinal trough members 51 extend upwardly a greater distance on the material receiving section 24 to provide adequate receiving means for the material discharged from the continuous mining machine boom 30. In addition the material receiving section 24 has a lateral rear wall 200 adjacent the material receiving end portion 48. The combination of the trough side walls 51 and the lateral rear wall 200 form a hopper to receive the material discharged from the continuous mining machine boom 30 irrespective of the alignment between the continuous mining machine boom 30 and the material receiving section 24.

The material receiving section 24 is secured to the continuous mining machine 18 by means of a cable 202. The cable 202 is not continuously in tension and the continuous mining machine does not continuously pull the articulated conveying means 22 (FIGS. 1 and 12) because this would require a continuous source of power from the continuous mining machine which can be effectively used otherwise in the mining operation. The material receiving section 24 is initially positioned adjacent the continuous miner 18 with the discharge boom extending a considerable distance over the material receiving section 24. The tension on cable 202 is then released and as the continuous mining machine progresses the boom 30 will move toward the receiving section and the material receiving end portion 48 and the cable 202 unwinds from the reel on the continuous miner 18. When the continuous mining machine has progressed to a point where the material being discharged from the boom 30 is being received on the receiving section material receiving end portion 48 the cable reel is energized and the cable 202 is wound thereon to pull the entire articulated conveying means 22 until the material receiving section 24 is again adjacent the continuous mining machine 18.

Two embodiments of the material discharging section 26 are shown in FIGS. 13, 14 and 15. The embodiment shown in FIG. 13 has the drive motor 204 secured beneath the conveyor belt 88 by means of a frame type supporting member 206. A clutch mechanism 208, diagrammatically shown, is operable to connect and disconnect the motor 204 with the rotatable shafts 72 so that the motor 204 may remain in operation without continuously rotating the shafts 72. The embodiment does not include a propelling means for the material discharging section 26 thus an independent means is required to withdraw the articulated conveying means 22 from a passageway when the material discharging section 26 shown in FIG. 13 is used.

In FIG. 14 there is shown another embodiment of a material discharging section 26. In this embodiment the drive motor 204 is positioned between the wheels 62 and has a similar clutch mechanism 208. In addition this embodiment has a lateral shaft 210 extending in spaced relation with the wheel members 62. The shaft 210 has a differential 212 and sprocket member 214. A second clutch mechanism 216 is positioned between the motor 204 and the differential 212. The wheel axle members 58 have extensions 218 extending inwardly toward the motor 204. Secured to the extensions 218 are sprockets 220. Roller chains 222 interconnect the shaft extensions 218 with the lateral shafts 210. Thus by manipulation of the clutch mechanisms 208 and 216 the motor 204 can be used as both a drive means for the rotatable shafts 72 and as a propelling means for the wheels 62 on the material discharging section 28. The axle members 58 are provided with steering means 224 diagrammatically shown in FIG. 15. The material discharging section 26 is thus steerable so that it may remain in discharge relation wtih the fixed conveyor means as the remainder of the articulated conveyor means follows the advancing continuous mining machine 18.

Secured to the top portion of the shaft housing 64 adjacent the material discharging end portion 50 is a stop member 226 which limits the articulate movement of adjacent sections to approximately 35° on each side of the longitudinal axis of the sections.

Figure 17:
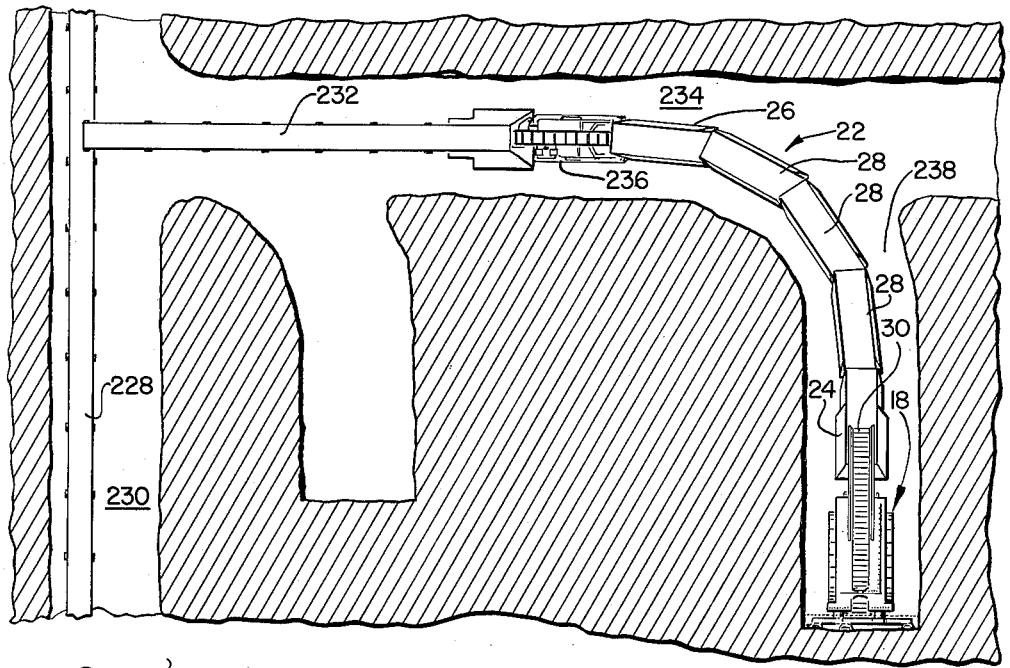
FIG. 17 is a plan view of my articulated conveying means adapted to feed material onto an extensible type conveyor belt.

In FIG. 17 there is shown a relatively fixed conveyor belt 228 positioned in a main haulageway 230. An extensible belt type conveyor 232, which may be similar to the extensible conveyor described in my copending application Ser. No. 525,053, now Patent No. 2,879,049, extends into a lateral connecting passageway 234. The extensible conveyor 232 is arranged to discharge material onto the fixed conveyor belt 228. A mine haulage vehicle or shuttle car 236 is arranged adjacent the material receiving free end portion of the extensible belt conveyor 232 and is adapted to discharge material thereon. A continuous mining machine 18 is shown dislodging material in a second longitudinal passageway 238 which is parallel to and spaced from the main haulageway 230. The material receiving section 24 is secured to the mining machine 18 as heretofore described and the material discharging section 26 is operatively associated with the shuttle car 236 to discharge material onto the shuttle car 236. A plurality of intermediate sections 28 connected between the material receiving section 24 and the material discharging section 26 provide a conveying circuit between the mining machine 18 and the extensible belt conveyor 232. As the mining machine 18 advances in the passageway 238 the articulated conveying means 22 follows the mining machine 18 and the shuttle car 236 with its tramming ability extends the extensible belt 232 so that there is a continuous conveying means between the continuous mining machine 18 and the relatively fixed conveyor belt 228.

After the continuous mining machine 18 has completed the desired penetration in the passageway 238 the shuttle car 236 moves toward the fixed conveyor belt 228 and linearly retracts the extensible conveyor belt 232. The shuttle car simultaneously withdraws the articulated conveying means 22 from the passageway 238. The continuous mining machine 18 may then progress and further develop passageway 234 or develop another longitudinal passageway similar to passageway 230. As a result of my invention it is now possible to maintain a continuous conveying means between a continuous mining machine and a relatively fixed conveyor during all phases of the mining operation.

As shown in FIGS. 6, 8, 9 and 10 the material discharging end portion 50 of one section is positioned in overlapping relation to the material receiving portion 48 of an adjacent section so that any material discharged from the material discharge portion 50 will cascade onto the material receiving portion 48 of the adjacent section. As shown in FIG. 10 irrespective of the angle between the longitudinal axes of adjacent coupled sections the material leaving the discharging end portion 50 cascades onto the material receiving portion 48 of an adjacent section.

The relative position of the shaft coupling assembly 140 and section coupling assembly 142 in relation to the material discharging end portion 50 and material receiving end portion 48 of adjacent sections is another feature of my invention. With this arrangement the material cascading from the material discharging end portion 50 strikes the material receiving end portion 48 of an adjacent section at a point substantially above the vertical axis of the vertical pin member 170. The shock and impact forces of the material cascading from the material discharging end portion 50 is absorbed above the section coupling assembly 142 and provide a more stable coupling between the sections.

The relative horizontal and vertical position of the section coupling assembly 142 in relation to the shaft coupling assembly 140 is another feature of my invention. This arrangement provides pivotal connections whereby the adjacent coupled sections may deviate from an aligned relation to each other without effecting the transmission of rotary movement from adjacent coupled shafts 72 and also retains relatively free pivotal movement between the sections.

The use of the high speed tubular shafts 72 as a means to transmit rotative movement is another feature of my invention. The combination of tubular shafts 72, drive take-off means 120 and the double universal type shaft coupling assemblies 140 now makes it possible to propel all the independent conveyor belts 88 on all the sections with a single power source. The combination is versatile and enables the power source to be connected to the coupled shafts at any convenient position. As shown in the illustrated embodiment the power source is positioned on the material discharging section 26. However, it is within the scope of this invention to position the power source elsewhere, for example on an intermediate section 28 or on the material receiving section 24. It is also within the scope of this invention to employ a plurality of power sources when load requirements so dictate.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

What is claimed is:

1. A portable articulated self-tracking conveying apparatus which comprises a series of interconnected self-supported sections, each of said sections having front and rear first coupling means to interconnect said self-supporting sections, each of said sections having independent endless conveyor means extending longitudinally thereon, mechanical actuating means on each of said sections to actuate said independent endless conveyor means positioned thereon, each of said sections having front and rear second coupling means to connect said mechanical actuating means of adjacent sections, each of said coupling means being movable about a plurality of vertical axes, each of said sections having floor engaging supporting means, said floor engaging supporting means being disposed substantially equidistantly between said front and rear first coupling means, drive means to drive said mechanical actuating means, and driving connections between said drive means and said endless conveyor means, said first coupling means, said second coupling means and said floor engaging supporting means coacting to automatically guide said sections through a turn so that said sections are self-tracking and follow each other around curves.

2. A portable articulated self-tracking conveying apparatus which comprises a series of interconnected self-supported sections, each of said sections having front and rear first coupling means to interconnect said self-supporting sections, each of said sections having independent endless conveyor means extending longitudinally thereon, a rotatable shaft secured to and extending longitudinally on each of said sections, connecting means between said rotatable shaft and said endless conveyor means operable to transform rotative movement of said shaft into longitudinal movement of said conveyor means, each of said sections having front and rear second coupling means to connect said rotatable shafts of adjacent sections to each other, each of said coupling means being movable about a plurality of vertical axes, each of said sections having floor engaging supporting means, said floor engaging supporting means being disposed substantially equidistantly between said front and rear first coupling means, drive means to drive all of said rotatable shafts, driving connections between said drive means and said rotatable shafts, said first coupling means, said second coupling means and said floor engaging means coacting to automatically guide said sections through a turn so that said sections are self-tracking and follow each other around curves.

3. The apparatus of claim 2 in which said connecting means includes speed reducing means.

4. The apparatus of claim 2 in which each of said front and rear second coupling means includes a universal joint connection constructed and arranged to be secured to a mating second coupling means universal joint of an adjacent section.

5. A portable articulated self-tracking conveying apparatus which comprises a series of interconnected self-supported sections, each of said sections having front and rear first coupling means to interconnect said self-supporting sections, each of said sections having a material receiving end portion, a material discharging end portion and an independent endless conveyor means extending longitudinally thereon, each of said sections having a rotatable shaft extending longitudinally thereon below said endless conveyor means, the longitudinal axis of said endless conveyor means being at an inclined angle to the longitudinal axis of said rotatable shaft so that the material discharging end portion is above the material receiving end portion when the longitudinal axis of said rotatable shaft extends horizontally, connecting means between said rotatable shaft and said endless conveyor means operable to transform rotative movement of said shaft into longitudinal movement of said conveyor means, each of said sections having front and rear second coupling means to connect said rotatable shafts of adjacent sections to each other, each of said sections having floor engaging supporting means, said floor engaging supporting means being disposed substantially equidistantly between said front and rear first coupling means, drive means to drive said rotatable shafts, driving connections between said drive means and said rotatable shafts, and bumper means extending outwardly from the sides of said sections, said first coupling means, said second coupling means and said floor engaging means coacting to automatically guide said sections through a turn so that said sections are self-tracking and follow each other around a curve.

6. A portable articulated self-tracking conveying apparatus which comprises a plurality of sections each having a material receiving end portion, a material discharging end portion, and wheeled floor engaging supporting means, said sections each having independent endless conveyor means extending longitudinally thereon, mechanical actuating means on each of said sections to actuate said independent endless conveyor means, each of said sections having front and rear first coupling means operable to connect said sections in series with the material receiving end portion of one of said sections positioned to receive material discharged from the material discharging end portion of the preceding section irrespective of the non-alignment of the longitudinal axis of one section in respect to the longitudinal axis of an adjacent section, second coupling means to connect said mechanical actuating means of adjacent sections, each of said second coupling means being movable about a plurality of vertical axes and operable to transmit substantially undiminished mechanical movement from one mechanical actuating means to the following mechanical actuating means irrespective of the non-alignment of the longitudinal axes of adjacent sections, said wheeled floor engaging supporting means being disposed substantially equidistantly between said front and rear first coupling means, drive means to drive said mechanical actuating means, and driving connections between said drive means and said mechanical actuating means, said first coupling means and said floor engaging means coacting to automatically guide said sections through a turn so that said sections are self-tracking and follow each other around a curve.

7. A portable articulated self-tracking conveying apparatus which comprises a plurality of sections each having a material receiving end portion, a material discharging end portion, and wheeled floor engaging supporting means, said sections each having independent endless conveyor means extending longitudinally thereon, mechanical actuating means on each of said sections to actuate said independent endless conveyor means, said sections having a first coupling means including a receiver member extending longitudinally thereon adjacent one end and an arm member extending longitudinally adjacent the other end, adjacent sections being positioned with the arm member of one section in operable relation with the receiver member of another section, a vertical pin member coupling said arm member of one section to said receiver member of another section for pivotal movement of said sections about the vertical axis of said pin member, second coupling means to connect said mechanical actuating means of adjacent sections, each of said second coupling means being movable about a plurality of vertical axes and operable to transmit substantially undiminished mechanical movement from one mechanical actuating means to the following mechanical actuating means irrespective of the non-alignment of the longitudinal axes of adjacent sections, said wheeled floor engaging means being disposed substantially equidistantly between said section first coupling means receiver member and arm member, drive means to drive said mechanical actuating means, and driving connections between said drive means and said mechanical actuating means, said first coupling means, said second coupling means and said floor engaging means coacting to automatically guide said sections through a turn so that said sections are self-tracking and follow each other around a curve.

8. A portable articulated self-tracking conveying apparatus which comprises a plurality of sections each having a material receiving end portion, a material discharging end portion, and wheeled floor engaging supporting means, said sections having a first coupling member including a receiver member extending longitudinally beneath said material receiving end portion and an arm member extending longitudinally beyond the material discharging end portion, said sections each having independent endless conveyor means extending longitudinally thereon, mechanical actuating means on each of said sections to actuate said independent endless conveyor means, adjacent sections being positioned with the arm member of one section in operable relation with the receiver member of the adjacent section, a vertical pin member coupling said arm member of one section and said receiver member of another section for pivotal movement about the vertical axis of said pin member whereby the material discharged from the material discharging end portion of one section will be received by the material receiving end portion of the adjacent section substantially above the vertical axis of said pin member irrespective of the non-alignment of the longitudinal axis of one section in respect to the longitudinal axis of an adjacent section, second coupling means to connect said mechanical actuating means of adjacent sections, each of said second coupling means being movable about a plurality of vertical axes and operable to transmit substantially undiminished mechanical movement from one mechanical actuating means to the following mechanical actuating means irrespective of the non-alignment of the longitudinal axes of adjacent sections, said wheeled floor engaging means being disposed substantially equidistantly between said section first coupling means receiver member and arm member, drive means to drive said mechanical actuating means, and driving connections between said drive means and said mechanical actuating means, said first coupling means, said second coupling means and said floor engaging means coacting to automatically guide said sections through a turn so that said sections are self-tracking and follow each other around a curve.

9. A portable articulated self-tracking conveying apparatus which comprises a plurality of sections each having a material receiving end portion, a material discharging end portion, and a pair of supporting wheels, said sections having a first coupling means including a receiver member extending longitudinally beneath said material receiving end portion and an arm member extending longitudinally beyond the material discharging end portion, said sections each having independent endless conveyor means extending longitudinally thereon, each of said sections having a rotatable shaft secured to and extending longitudinally below said receiver member and said arm member, each of said sections having connecting means between said rotatable shaft and said endless conveyor means operable to transform rotative movement of said shaft into longitudinal movement of said conveyor means, adjacent sections being positioned with the arm member of one section in operable relation with the receiver member of the adjacent section, a vertical pin member coupling said arm member of one section and said receiver member of an adjacent section for pivotal movement about the vertical axis of said pin member whereby the material discharged from the material discharging end portion of one section will be received by the material receiving end portion of the adjacent section above the vertical axis of said pin member irrespective of the non-alignment of the longitudinal axis of one section in respect to the longitudinal axis of an adjacent section, second coupling means to connect said rotatable shafts of adjacent sections to each other in the same horizontal plane, each of said second coupling means including a pair of universal joint connections secured to each other, said pair of supporting wheels positioned substantially intermediate said section first coupling means receiver member and arm member, drive means to rotate said rotatable shafts, and driving connections between said drive means and said rotatable shafts, said first coupling means, said second coupling means and said supporting wheels coacting to automatically guide said sections through a turn so that said sections are self-tracking and follow each other around a curve.

10. A portable articulated self-tracking conveying apparatus which comprises a plurality of sections each having a material receiving end portion, a material discharging end portion and a pair of supporting wheels, said sections having a first coupling means including a receiver member extending longitudinally beneath said material receiving end portion and an arm member extending longitudinally beyond the material discharging end portion, said sections each having independent endless conveyor means extending longitudinally above said receiver member and said arm member, each of said sections having a rotatable shaft secured to and extending longitudinally below said receiver member and said arm member, the longitudinal axis of said independent endless conveyor means being at an inclined angle to the longitudinal axis of said rotatable shaft so that the material discharging end portion of said section is above the material receiving end portion of the same section when the longitudinal axis of said rotatable shaft is in a horizontal plane, each of said sections having connecting means between said rotatable shaft and said endless conveyor means operable to transform rotative movement of said shaft into longitudinal movement of said conveyor means, adjacent sections being positioned with the arm member of one section in operable relation with the receiver member of the adjacent section, a vertical pin member coupling said arm member of one section and said receiver member of an adjacent section for pivotal movement about the vertical axis of said pin member whereby the material discharged from the material discharging end portion of one section will be received by the material receiving end portion of the adjacent section above the vertical axis of said pin member irrespective of the non-alignment of the longitudinal axis of one section in respect to the longitudinal axis of an adjacent section, second coupling means to connect said rotatable shafts of adjacent sections to each other in the same horizontal plane, each of said second coupling means including a pair of universal joint connections secured to each other, said pair of supporting wheels positioned substantially intermediate said section first coupling means receiver member and arm member, drive means to rotate said rotatable shafts, and driving connections between said drive means and said rotatable shafts, said first coupling means, said second coupling means and said wheels coacting to automatically guide said sections through a turn so that said sections are self-tracking and follow each other around a curve.

11. The apparatus of claim 9 in which the vertical axis through the midpoint of said pair of universal joints is aligned with the vertical axis of the adjacent pin member.

12. A portable conveyor section comprising a body portion having side walls, a material receiving end portion, a material discharging end portion and a conveyor receiving portion extending longitudinally between said side walls, a rotatable wheel member secured at each side of said body portion to support said body portion, a first roller rotatably mounted on said body portion adjacent said material receiving end portion, a second roller rotatably mounted on said body portion adjacent said material discharging end portion, said rollers extending laterally to the longitudinal axis of said body portion, an endless conveyor belt passing around both of said rollers and having an upper run and a lower run, a deck plate positioned in said conveyor receiving portion between said conveyor belt upper run and lower run, said deck plate being supported by said body portion side walls and operable to support said conveyor belt upper run, take-up means operable to move said second roller longitudinally on said body portion to tension said endless conveyor belt against both of said rollers, a shaft rotatably secured to said body portion below said conveyor belt lower run and extending longitudinally thereon, drive connections between said shaft and said first roller, first coupling means including coupling connections at each end of said body portion operable to connect a plurality of said sections in series, each of said rotatable wheel members being disposed substantially equidistantly between said section first coupling means coupling connections and second coupling means including universal connections at each end of said rotatable shaft operable to connect a plurality of said shafts in series, said first coupling means, said second coupling means and said wheel members adapted to coact to automatically guide coupled sections through a turn so that said sections are self-tracking and follow each other around a curve.

13. A portable conveyor section comprising a body portion having side walls, a material receiving end portion, a material discharging end portion and a conveyor receiving portion extending longitudinally between said side walls, a rotatable wheel member secured at each side of said body portion to support said body portion, said side walls each having aligned longitudinal slotted portions adjacent said material discharging end portion and longitudinal flanged portions extending outwardly from said body portion, said flanged portions extending outwardly beyond the outboard side of said respective wheel member, a pair of belt take-up members having a central aperture positioned slideably in said side wall longitudinal slotted portions, a first roller member rotatably mounted on said body portion adjacent said material receiving end portion, a second roller rotatably mounted in said take-up members adjacent said material discharge end portion, said rollers extending transversely to the longitudinal axis of said body portion, an endless conveyor belt passing around both of said rollers and having an upper run and a lower run, a deck plate positioned in said conveyor receiving portion between said conveyor belt upper run and lower run, said deck plate being supported by said body portion side walls and operable to support said conveyor belt upper run, adjustable means connected to each of said take-up members and operable to move said second roller longitudinally on said body portion to tension said endless conveyor belt against both of said rollers, a shaft rotatably secured to said body portion below said conveyor belt lower run and extending longitudinally thereon, an externally toothed gear member secured to said shaft member adjacent said material receiving end portion, a speed reducer secured to said side wall adjacent said material receiving end portion in operable relation with said first roller and having a power input shaft extending longitudinally therefrom, a shaft member connected to said speed reducer power input shaft and rotatably supported on said side wall, said shaft having an externally toothed gear member secured thereon, a chain type drive mechanism connecting said first named gear on said rotatable shaft and said second gear on said last named shaft, pin type coupling means between said last named shaft and said speed reducer power input shaft, a first coupling means including coupling connections at each end of said body portion operable to connect a plurality of said sections in series, said rotatable wheel member positioned substantially intermediate said first coupling means coupling connections, and second coupling means including universal connections at each end of said rotatable shaft operable to connect a plurality of said shafts in series, said first coupling means, said second coupling means and said wheel members adapted to coact to automatically guide coupled sections through a turn so that said sections are self-tracking and follow each other around a curve.

14. A portable conveyor section comprising a body portion having side walls, a material receiving end portion, a material discharging end portion and a conveyor receiving portion extending longitudinally between said side walls, a rotatable wheel member secured at each side of said body portion to support said body portion, a first roller rotatably mounted on said body portion adjacent said material receiving end portion, a second roller rotatably mounted on said body portion adjacent said material discharge end portion, said rollers extending laterally to the longitudinal axis of said body portion, an endless conveyor belt passing around both of said rollers and having an upper run and a lower run, a deck plate positioned in said conveyor receiving portion between said conveyor belt upper run and lower run, said deck plate being supported by said body portion side walls and operable to support said conveyor belt upper run, take-up means operable to move said second roller longitudinally on said body portion to tension said endless conveyor belt against both of said rollers, a first coupling means including a receiver member extending longitudinally beneath said material receiving end portion and an arm member extending longitudinally beyond said material discharging end portion, a shaft rotatably secured to said body portion below said receiver member and said arm member and extending longitudinally of said body portion, the longitudinal axis of said conveyor belt being at an inclined angle to the longitudinal axis of said shaft so that the material discharging end portion of said section is above the material receiving end portion when the longitudinal axis of said shaft is in a horizontal plane, said rotatable wheel member positioned substantially intermediate said first coupling means coupling connections, drive connections betwen said shaft and said first roller, said arm member having a vertical pin member operable to extend into apertures in the receiver member of a similar conveyor section to connect said sections in series, and second coupling means including universal connections at each end of said rotatable shaft operable to connect a plurality of said shafts in series, said first coupling means, said second coupling means and said wheel members adapted to coact to automatically guide coupled sections through a turn so that said sections are self-tracking and follow each other around a curve.

15. Portable articulated self-tracking conveying apparatus adapted to follow a continuous mining machine and convey the dislodged material from said continuous miner along an angular path to a stationary conveyor belt comprising a receiving section adjacent said continuous mining machine, a discharge section adjacent said stationary conveyor belt and a plurality of intermediate sections therebetween, said receiving, discharge and intermediate sections being interconnected to each other and each having independent endless conveyor means extending longitudinally thereon, mechanical actuating means on each of said sections to actuate said independent conveyor means positioned thereon, coupling means to connect said mechanical actuating means of adjacent sections, each of said coupling means being movable about a plurality of vertical axes, said sections each having a pair of supporting wheels positioned intermediate their ends, said receiving section having hopper means adapted to receive material from said continuous mining machine and second coupling means for connecting said receiving section to said continuous mining machine for pulling said conveying apparatus in one direction, said discharging section having drive means to drive said mechanical actuating means on all of said sections, driving connections between said drive means and said discharge section mechanical actuating means, and steering means for said discharge section adapted to maintain said discharge section in discharge relation with said stationary conveyor belt as said continuous mining machine and said conveying apparatus advance during the mining operation.

16. The conveying apparatus defined in claim 15 in which said discharge section drive means is also operable to propel said conveying apparatus in the opposite direction.

17. Apparatus for mining coal comprising a continuous mining machine, an extensible straight line belt conveyor, a plurality of portable articulated self-tracking conveyor sections interconnected in end to end relation and disposed between said continuous mining machine and said extensible straight line belt conveyor, the end section adjacent said continuous mining machine being connected thereto and operable to move forwardly therewith, said sections each having independent endless conveyor means extending longitudinally thereon, actuating means on each of said sections to actuate said independent endless conveyor means positioned thereon, coupling means to connect said mechanical actuating means of adjacent sections, each of said coupling means being pivotally movable about a plurality of vertical axes, drive means to drive said mechanical actuating means, driving connections between said drive means and said mechanical actuating means, and means associated with said extensible straight line belt conveyor to move said sections upon retractile movement of said continuous mining machine.

18. Apparatus for mining coal comprising a continuous mining machine, an extensible straight line belt conveyor, a shuttle car adjacent the loading end of said extensible belt conveyor and a plurality of portable articulated self-tracking conveyor sections interconnected in end to end relation and disposed between said shuttle car and said continuous mining machine, the end section adjacent said continuous mining machine being connected thereto and operable to move forwardly therewith, the end section adjacent said shuttle car being connected thereto so that material discharged by said last named end section will be received by said shuttle car and conveyed to said extensible conveyor belt, said sections each having a material receiving end portion, a material discharging end portion, and wheeled supporting means, said sections each having independent endless conveyor means extending longitudinally thereon, mechanical actuating means on each of said sections to actuate said independent endless conveyor means, first coupling means operable to connect said sections in series with the material receiving end portion of one of said sections positioned to receive material discharged from the material discharging end portion of the preceding section irrespective of the nonalignment of the longitudinal axis of one section in respect to the longitudinal axis of an adjacent section, second coupling means to connect said mechanical actuating means of adjacent sections, each of said second coupling means being pivotally movable about a plurality of vertical axes and operable to transmit substantially undiminished mechanical movement from one mechanical actuating means to the following mechanical actuating means irrespective of the non-alignment of the longitudinal axes of adjacent sections, drive means to drive all of said mechanical actuating means, and driving connections between said drive means and said mechanical actuating means, said shuttle car being operable to extend said extensible straight line belt as said continuous mining machine advances and to retract said belt and withdraw said sections upon retractile movement of said continuous mining machine.

19. A portable articulated self-tracking conveying apparatus comprising a series of interconnected sections, each of said sections having front and rear first coupling means to interconnect said sections, each of said sections having floor engaging supporting means disposed substantially equidistantly between said front and rear coupling means, each of said sections having independent endless conveyor means extending longitudinally thereon, actuating means on each of said sections to actuate said independent endless conveyor means positioned thereon, and drive means to drive said actuating means and thereby drive said conveyor means, said coupling means and said floor engaging means coacting to automatically guide said sections through a turn so that said sections are self-tracking and follow each other around curves.

References Cited in the file of this patent

UNITED STATES PATENTS

| | | |
|---|---|---|
| 1,305,228 | Maxwell | May 27, 1919 |
| 1,444,775 | Bennett | Feb. 13, 1923 |
| 1,693,344 | Morgan | Nov. 27, 1928 |
| 2,282,267 | Swenson et al. | May 5, 1942 |
| 2,321,168 | Tognetti | June 8, 1943 |
| 2,433,697 | Hulse | Dec. 30, 1947 |
| 2,480,294 | Hume | Aug. 30, 1949 |
| 2,507,742 | Tuft | May 16, 1950 |
| 2,549,178 | Dear | Apr. 17, 1951 |
| 2,674,364 | Cartlidge | Apr. 6, 1954 |
| 2,722,409 | Bergmann | Nov. 1, 1955 |
| 2,725,976 | Madeira | Dec. 6, 1955 |
| 2,776,040 | Snyder | Jan. 1, 1957 |
| 2,805,758 | Madeira et al. | Sept. 10, 1957 |
| 2,805,760 | Von Stroh et al. | Sept. 10, 1957 |
| 2,852,127 | Barrett | Sept. 16, 1958 |